United States Patent
Sanchez et al.

(10) Patent No.: US 9,071,615 B2
(45) Date of Patent: *Jun. 30, 2015

(54) SHARED SPACE FOR COMMUNICATING INFORMATION

(75) Inventors: Russell Sanchez, Seattle, WA (US); Christian Colando, Seattle, WA (US); Seiya Ohta, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1333 days.

This patent is subject to a terminal disclaimer.

(21) Appl. No.: 12/713,582

(22) Filed: Feb. 26, 2010

(65) Prior Publication Data

US 2010/0153857 A1    Jun. 17, 2010

Related U.S. Application Data

(63) Continuation of application No. 11/599,599, filed on Nov. 13, 2006, now Pat. No. 7,698,660.

(51) Int. Cl.
| | |
|---|---|
| *G06F 3/00* | (2006.01) |
| *G06F 3/033* | (2013.01) |
| *G06F 3/048* | (2013.01) |
| *H04L 29/08* | (2006.01) |

(Continued)

(52) U.S. Cl.
CPC .......... *H04L 67/104* (2013.01); *H04L 67/1095* (2013.01); *G06F 9/4443* (2013.01); *H04L 67/1068* (2013.01); *H04L 67/36* (2013.01); *G06F 9/543* (2013.01); *H04L 67/14* (2013.01); *H04L 67/1046* (2013.01); *H04L 67/148* (2013.01); *H04L 67/1078* (2013.01); *G06Q 10/10* (2013.01)

(58) Field of Classification Search
USPC .................................. 715/750–751, 753–761
See application file for complete search history.

(56) References Cited

U.S. PATENT DOCUMENTS 5,758,079 A    5/1998 Ludwig et al.
5,999,208 A *  12/1999 McNerney et al. ........... 715/757

(Continued)

FOREIGN PATENT DOCUMENTS

| JP | 2001-265704 | 9/2001 |
| JP | 2007-518146 | 7/2007 |

(Continued)

OTHER PUBLICATIONS

Farella et al., "Multi-Client Cooperation and Wireless Pda Interaction in Immersive Virtual Environment", http://www-micrel.deis.unibo.it/~farella/doc/Farella115def.pdf—(Publicly known at least as early as Aug. 2006).

(Continued)

*Primary Examiner* — Weilun Lo
*Assistant Examiner* — Truc Chuong
(74) *Attorney, Agent, or Firm* — John Jardine; Kate Drakos; Micky Minhas

(57) ABSTRACT

Embodiments provide a shared space for communicating information. In an embodiment a number of users associated with a computing environment can use a shared space to communicate information with one another. Each computing device of the computing environment can include a shared space application. The shared space application includes a number of interactive tools that can be used to persist various communications between associated computing devices of a computing environment.

20 Claims, 16 Drawing Sheets

(51) Int. Cl.
*G06F 9/44* (2006.01)
*G06F 9/54* (2006.01)
*G06Q 10/10* (2012.01)

(56) References Cited

U.S. PATENT DOCUMENTS

| | | | |
|---|---|---|---|
| 6,351,271 | B1 | 2/2002 | Mainwaring et al. |
| 6,437,778 | B1 | 8/2002 | Matsui et al. |
| 6,564,246 | B1 | 5/2003 | Varma et al. |
| 6,587,870 | B2 | 7/2003 | Takagi et al. |
| 6,629,129 | B1 | 9/2003 | Bookspan et al. |
| 7,086,005 | B1 | 8/2006 | Matsuda |
| 7,099,919 | B2 | 8/2006 | Kusumoto et al. |
| 7,124,164 | B1 | 10/2006 | Chemtob |
| 7,478,129 | B1* | 1/2009 | Chemtob ............. 715/758 |
| 7,698,660 | B2 | 4/2010 | Sanchez et al. |
| 2004/0003090 | A1 | 1/2004 | Deeds |
| 2004/0237033 | A1* | 11/2004 | Woolf et al. ............ 715/512 |
| 2005/0004985 | A1 | 1/2005 | Stochosky |
| 2005/0083907 | A1 | 4/2005 | Fishler |
| 2005/0132288 | A1 | 6/2005 | Kirn et al. |
| 2006/0010240 | A1 | 1/2006 | Chuah |
| 2006/0095514 | A1 | 5/2006 | Wang et al. |
| 2006/0112343 | A1 | 5/2006 | Ducheneaut et al. |
| 2006/0174207 | A1 | 8/2006 | Deshpande |

FOREIGN PATENT DOCUMENTS

| | | | | |
|---|---|---|---|---|
| KR | 1020060026409 | A | 3/2006 | |
| RU | 2359321 | C2 | 6/2009 | |
| WO | WO2008063833 | A1 | 5/2008 | ............ G06F 15/16 |

OTHER PUBLICATIONS

Leung et al., "Creating a multiuser 3-D virtual environment", Date: May 2001, On pp. 9-16, vol. 18, Issue: 3, http://ieeexplore.ieee.org/xpl/abs_free.jsp?arNumber=924884.

Roussel, Nicolas, "Mediascape: a Web-based Mediaspace", http://citeseer.ist.psu.edu/cache/papers/cs/25847/http:zSzzSzwww-ihm.lri.frzSzzCz7erousselzSzpublicationszSzmultimedia.pdf/roussel99mediascape.pdf—(Publicly known at least as early as Aug. 2006).

PCT Search Report dated Apr. 29, 2008 International Application No. PCT/US2007/083024.

http://www.geimaginationcubed.com, 5 pages (Publicly known at least as early as Mar. 2005).

Australian Office Action for Application No. 2007324103 mailed May 27, 2011.

Notice of Acceptance for Australian Application No. 2007324103 mailed Sep. 14, 2011.

Chinese First Office Action for Application No. 200780042038.3 mailed Jun. 23, 2010.

Chinese Second Office Action for Application No. 200780042038.3 mailed Apr. 28, 2011.

Chinese Notice of Allowance for Application No. 200780042038.3 mailed Aug. 25, 2011.

Japanese Office Action for Application No. 2009-537263 mailed Feb. 21, 2012.

Japanese Notice of Allowance for Application No. 2009-537263 mailed Jun. 22, 2012.

Russian Notice of Allowance for Application No. 2009117840/08 mailed Feb. 7, 2012.

European Search Report for Application No. PCT/US2007083024 mailed Mar. 28, 2013.

Brinck et al., A Collaborative Medium for the Support if Conversational Props, Nov. 1992 CSCW 92 Proceedings. pp. 171-178.

Geyer et al., A Team Collaboration Space Supporting Capture and Access of Virtual Meetings, Proceedings of the 2001 International ACM Siggroup Conference on Supporting Group Work, ACM. pp. 188-196.

Roseman et al., TeamRooms: Network Places for Collaboration, Proceeding of the 1996 ACM Conference on Computer Supported Cooperative Work. pp. 325-333.

Kolland et al., Information Sharing in Collaborative Environments, Enabling Technologies: Infrastructure for Collaborative Enterprises 1994. pp. 140-154.

Notice of Preliminary Rejection for Korean Application No. 10-2009-7010393 mailed Feb. 28, 2014.

Notice of Allowance Received for Korea Patent Application No. 10-2009-7010393, Mailed Date: May 20, 2014, Filed Date: Oct. 30, 2007, 2 Pages. (MS# 317502.10)(w/o English Translation).

"Office Action Issued in Canadian Patent Application No. 2,666,340", Mailed Date: Nov. 28, 2014, 5 Pages.

* cited by examiner

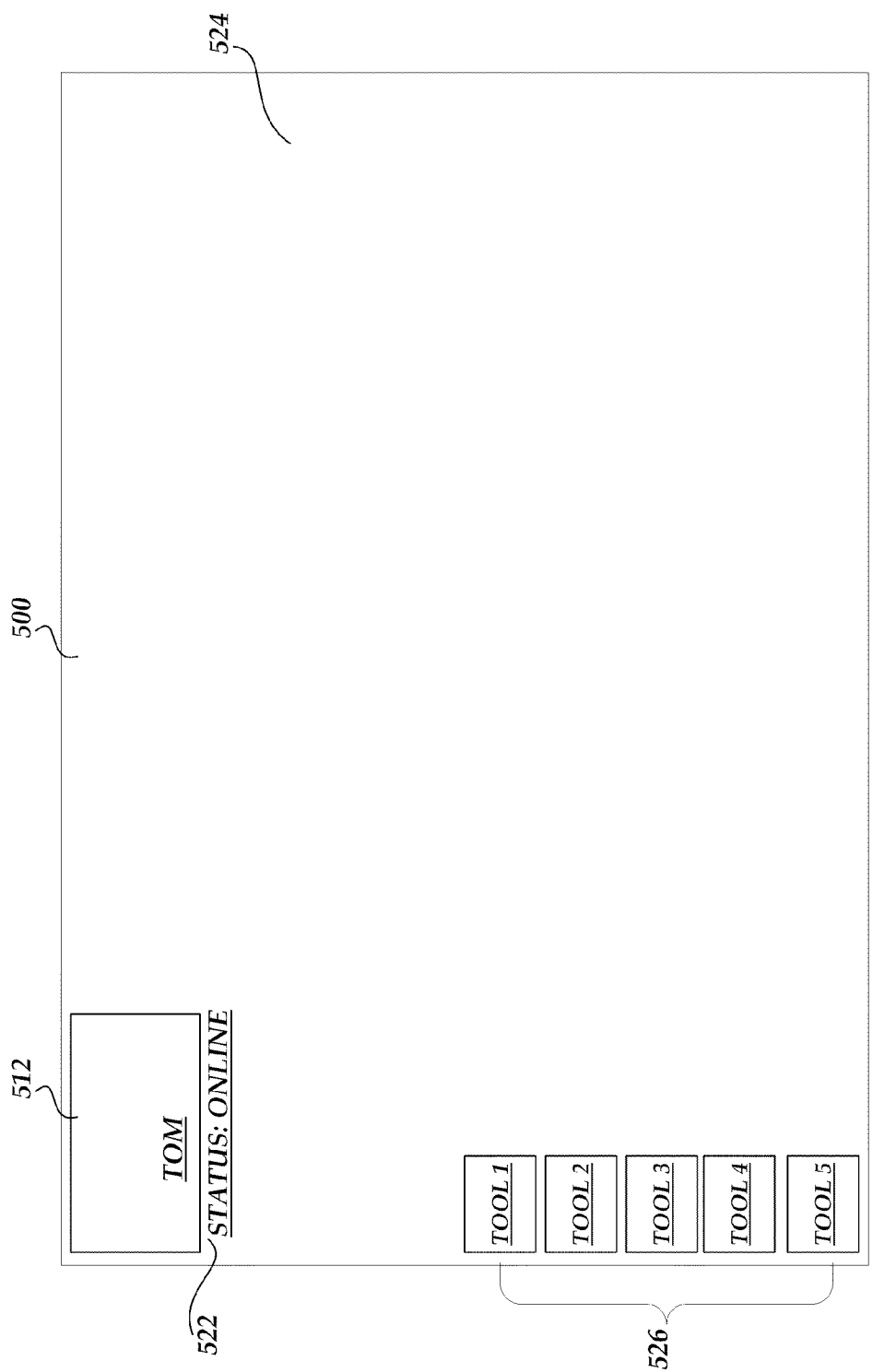

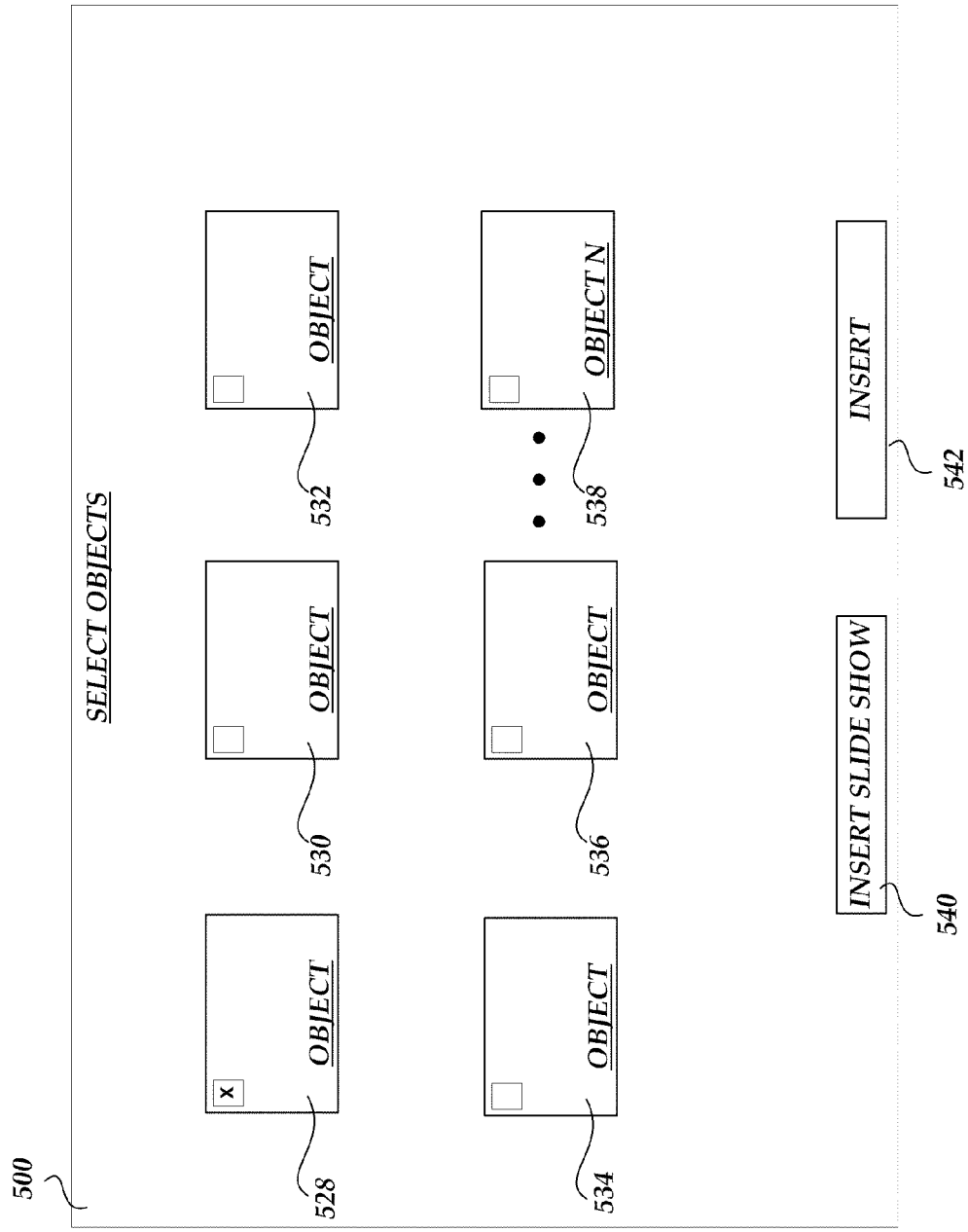

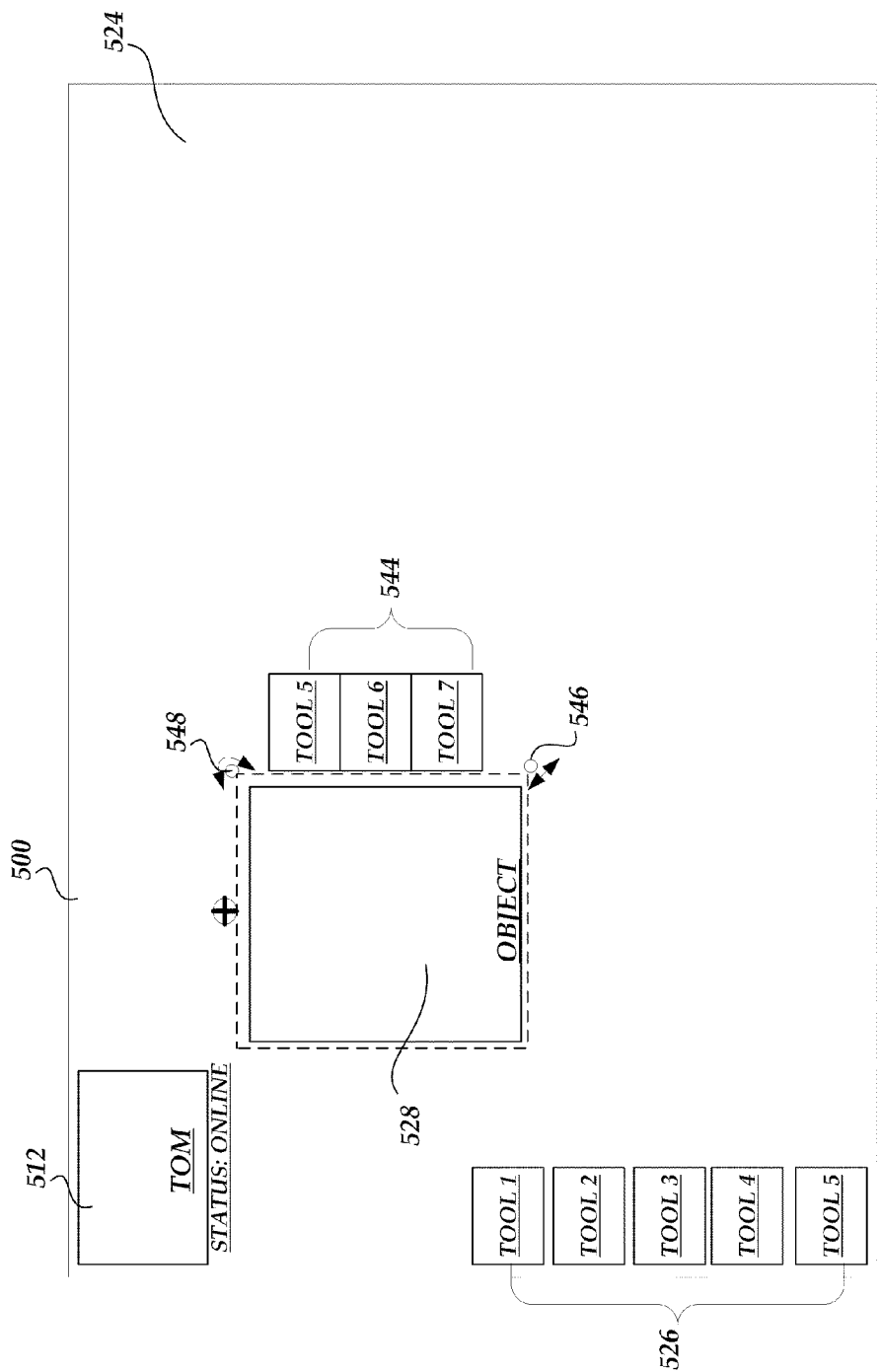

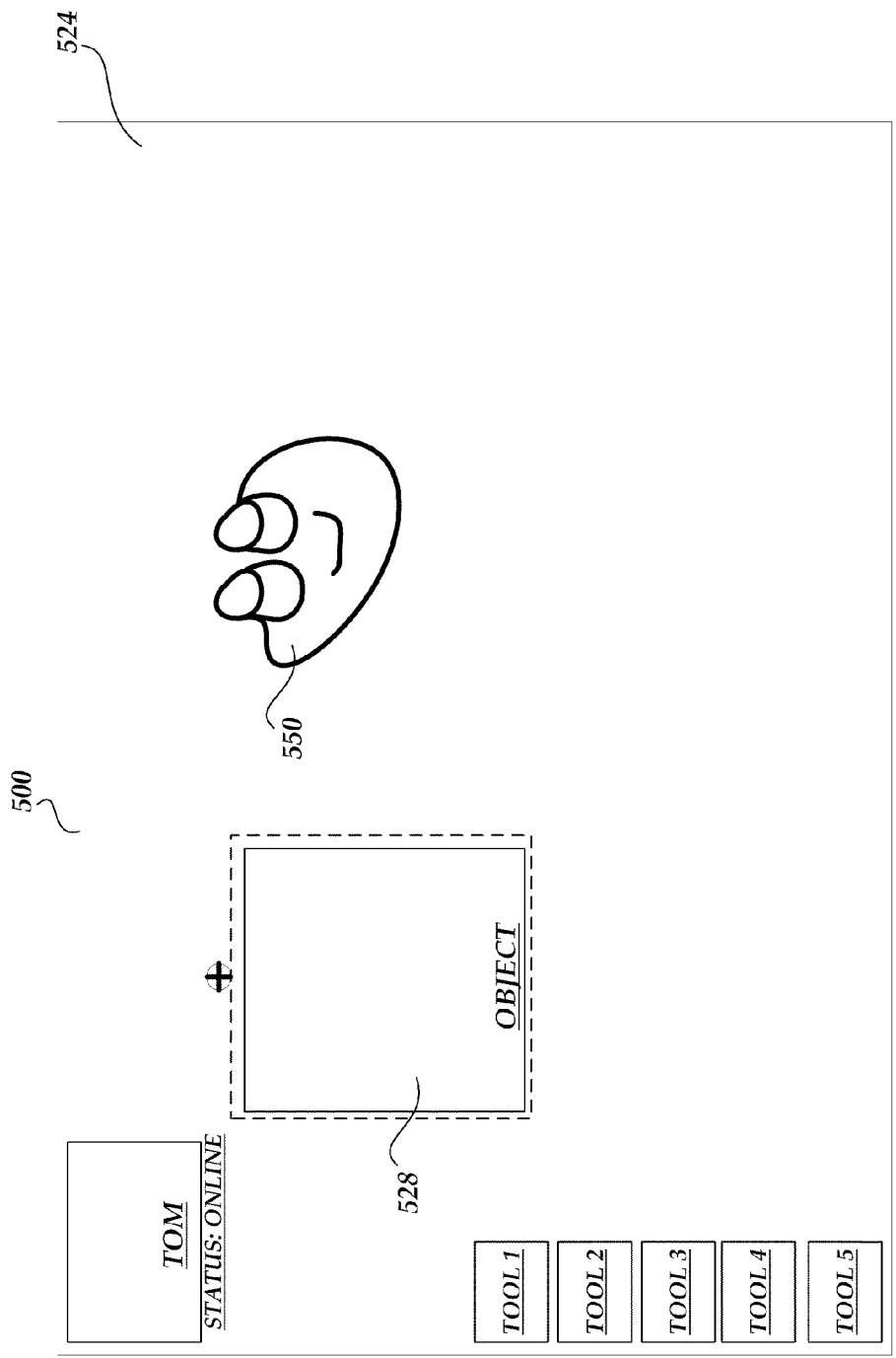

SHARED SPACE FOR COMMUNICATING INFORMATION

RELATED CASE

This application is a continuation of U.S. Pat. No. 7,698,660, filed Nov. 13, 2006 and entitled "Shared Space for Communicating Information," which is hereby incorporated by reference.

BACKGROUND

People try to communicate and stay connected using a number of communication methods, such as: postal mail, phones, digital photos, whiteboards, e-mail, and instant messaging (IM) applications. However, each technique has associated limitations and can result in an unsatisfactory experience for the user. For example, instant messages, networked digital picture frames, and e-mail can be untimely and constrain the amount of information that can be communicated. Some communication methods, like phone and IM communications, can be intrusive by forcing a party to respond in real-time. Passive communication methods, like email, and postal mail communications allow for delayed responses, but are typically less intrusive since a party can wait to respond. However, passive methods can be impersonal and deficient in emotional expressiveness because they impose a turn taking statement/reply/statement/reply communications structure (e.g. e-mail and instant messaging).

Other communication methods lack fidelity, variety of expressiveness, or are limited to providing information in temporary sessions (e.g. instant messaging, virtual whiteboards). Once the session ends, the information is lost. For example, whiteboards are often used as a medium to communicate spontaneous handwritten ideas and concepts. However, information displayed on the whiteboard is not ideal for remote interaction and collaboration. It can be difficult for remote users to read and focus upon relevant portions of a whiteboard, due in part to the limitations associated with video teleconferencing equipment. For example, ink strokes written on a whiteboard can be hard to see, and cannot be erased or edited by remote users. Thus, real-time multi-user physical whiteboard collaboration is limited and generally an unsatisfactory experience for the remote participant.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide a "shared space" for communicating information. The shared space can be configured to allow a number of users to communicate by using the shared space. In an embodiment, a shared space application is configured to provide a persistent space that can be shared for interaction by two or more users. A user can have a number of separate spaces to share and communicate with other individuals and/or groups. In various embodiments, the shared space can be interacted with and populated using a flexible aggregation of simple communication tools for sharing and communicating a variety of information. The communication tools and the shared space provide users with a persistent means to naturally and conveniently interact and communicate.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIGS. 5A-5K illustrate a user interface for interacting with a shared space.

DETAILED DESCRIPTION

Embodiments provide a shared spaced, wherein a number of users can use the shared space to communicate information. The shared space can be configured to allow a number of users to communicate by using the shared space. In an embodiment a shared space application is configured to provide a persistent space that can be shared and used by two or more users to communicate using various tools. A display of a computing device can be used to present a shared space to users who are using the shared space application to share such a space. The users can use the various tools provided by the shared space application to interact with the shared space in real-time or at their convenience.

In one embodiment, a plurality of shared spaces can be presented on one or more displays, thereby allowing a user to concurrently interact with various individuals and/or groups. That is, a user can have separate spaces to keep in touch and communicate with different individuals and/or groups. In various embodiments, the shared space can be populated using a flexible aggregation of simple communication tools that allow for the sharing of a variety of information. For example, the communication tools can be used by a user to populate a shared space with imagery, text, audio, handwritten drawings and words (e.g. digital ink), and/or other data. The communication tools are configured to afford natural and convenient communication and interaction.

In an embodiment, a shared space is persistent and remains available to an associated participant at all times, even when a participant is not using the space and/or signed in (e.g. offline). A user can invite one or more participants to share one or more spaces. A participant of a shared space can add to, delete from, and/or otherwise modify the space. Thereafter, all participants of the shared space see or will see the same result of the interaction. The shared space application is configured to allow a participant to save content to a private scrapbook, since the nature of the shared space can be highly transitory. Moreover, the shared space application is configured to use shared and private data, but is not so limited. In one embodiment, the shared space application is further configured to enable a "live connection." The live connection enables a number of participants to engage in live audio and/or video communication using the shared space application.

Figure 1:
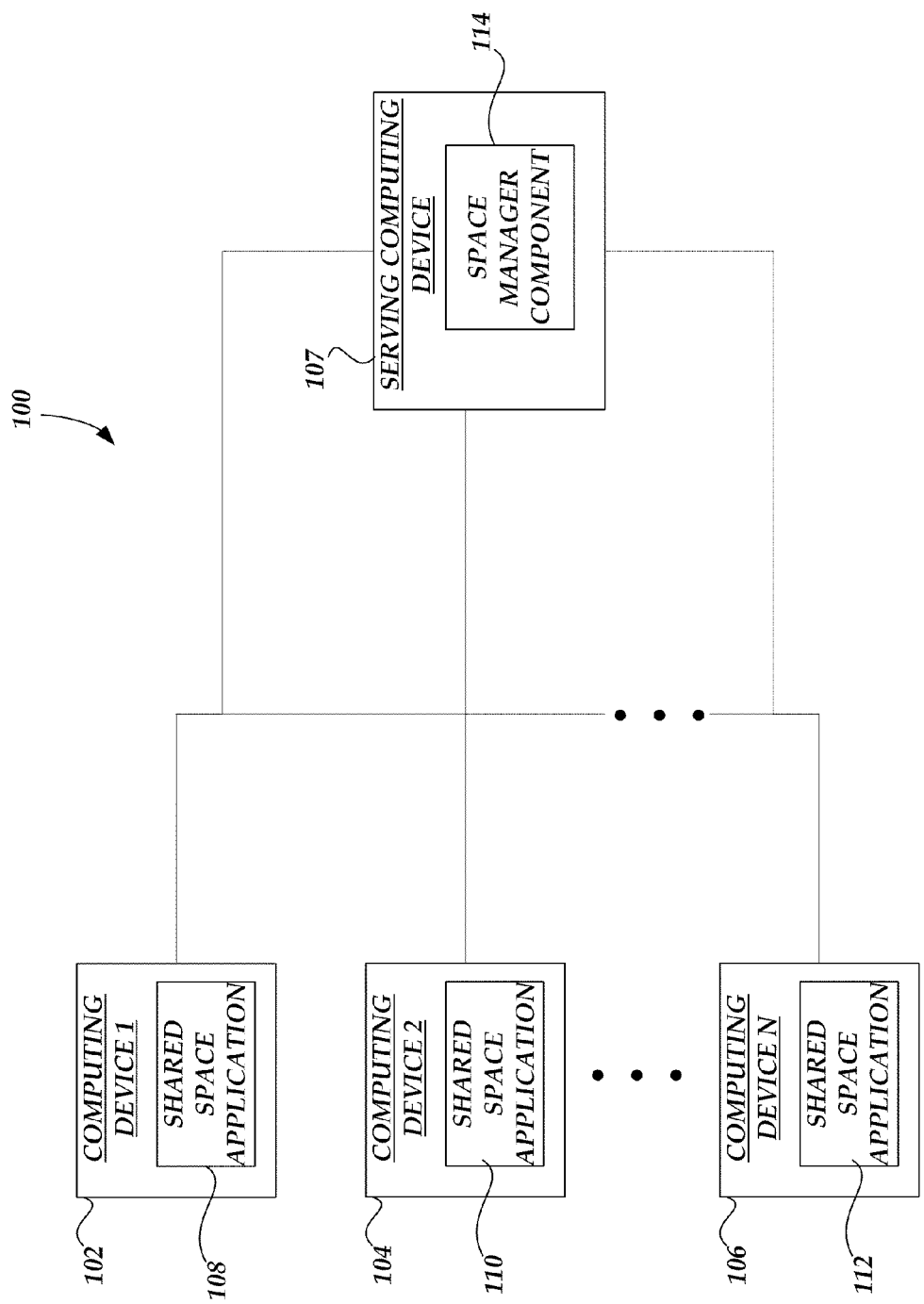
FIG. 1 is a block diagram of a computing environment.

FIG. 1 is a block diagram of a computing environment 100, under an embodiment. The computing environment 100 can be described as a network of components wherein the associated components are communicatively coupled in such a manner to provide an operational functionality. A number of computing devices 102-106 are in communication with one another to provide a network of computing devices. The number if computing devices 102-106 also can be in communication with a serving computing device 107. Each computing device 102-107 includes networking and security components configured to provide communication functionality between the computing devices 102-107. The computing devices 102-106 can include desktop computers, laptop computers, tablet computers, handheld devices, and other communication devices.

As shown in FIG. 1, each computing device 102-106 includes a shared space application 108-112, described further below. The serving computing device 107 includes a space manager component 114, but is not so limited. The space manager component 114 can be configured and operated to manage aspects of one or more shared spaces, but is not so limited. For example, the space manager component 114 can maintain a read-write master data file that is associated with a shared space. In an embodiment, each shared space application 108-112 and the space manager component 114 comprise software applications that execute in conjunction with processors of computing devices 102-107. As described below, each shared space application 108-112 is configured to provide a persistent space to a number of users that are associated with the shared space. In order to streamline the discussion below, the computing device 102 and associated shared space application 108 are referred to when describing the functionality and use of the shared space application.

As described below, a user can use the computing device 102 and associated shared space application 108 to communicate and interact with other users of a shared space. The shared space can be described as a persistent canvas or interactive window that can be used by two or more users to communicate in a variety of ways. That is, the shared space application 108 is configured to persist user interactions, including various expressions, for an associated shared space. Correspondingly, the user interactions are seen by all users associated with the shared space, regardless of their physical location. In various embodiments, anything that is created, placed, or otherwise located (ink, video files, audio files, text, pictures, etc.) in a shared space is persisted in the shared space until deleted or otherwise modified.

A user can use the shared space application 108 to interact with a number of separate spaces and/or users. For example, a user can use the shared space application 108 to create a number of shared spaces which enable the user to keep in touch with various individuals and/or groups. A user's interaction with a shared space is termed an expression. The shared space application 108 is configured to persist an expression in the shared space until the expression is deleted or otherwise modified by a user associated with the shared space. For example, if a user draws a picture or posts a photo in a shared space, the items remain in the shared space, even if they are covered by other items.

The shared space application 108 can be installed on the computing device 102. For example, the shared space application 108 can be installed as part of an operating system (OS) installation process. As described above, a user can use the shared space application 108 to communicate with one or more users or participants of a shared space. Additionally, the communication of a shared space can be provided to a number of associated computing devices. The communication of a shared space to a plurality of computing devices makes collaboration and interaction a pleasurable experience, even for users in remote locations. Thus, the shared space application 108 provides a convenient medium for communicative interaction to businesses, families, friends and others.

For example, the communication of a shared space can be provided to a number of ultra-mobile computing devices and associated users communicating over a network, such as the Internet. In one embodiment, the communication of the shared space is provided over the Internet using an online file storage service. In another embodiment, the communication of the shared space is provided to a number of computing devices using a peer-to-peer service, such as a peer-to-peer synchronization service for example.

The communication of the shared space can be provided to the computing devices 102-107 of a computing network, such as wireless local area network (WLAN), local area network (LAN), wide-area network (WAN), combinations thereof, and/or some other type of computing and/or communication network. In one embodiment, the computing environment 100 is a distributed computer network that allows one or more computing devices, communication devices, databases, etc., to communicate according to a desired implementation.

The components of the computing environment 100 can be communicatively coupled to one another using wired, wireless, combinations of wired and wireless, and other communication techniques. The communication of a shared space can also include combinations of various communication methods. Other embodiments that communicate a shared space include file/folder sharing methodologies and/or synchronization schemes. For example, a file/folder sharing program such as FOLDERSHARE can be used to communicate a shared space and the associated displayed content.

In an embodiment, a shared space application 108 is configured to operate on, persist, and/or display the content(s) of a master file, such as a read-only copy of a master file for example. The master file can be updated when the shared space is modified or otherwise changed. That is, the shared space application uses the master file to track and maintain changes to the shared space. In one embodiment, a master file is associated with each shared space. Each computing device 102-106 can use the master file to display the content(s) of the shared space, including recent changes and modifications to the shared space.

In one embodiment, each computing device 102-106 is associated with a peer-to-peer network and uses a master file that is associated with a shared space. When a computing device 102-106 associated with a shared space is connected and online, the master data file changes state from a read-only state to a read-write state. Thereafter, the local master data files are synchronized in real-time as additions, deletions, and other changes are made to the associated shared space. When a computing device disconnects (e.g. the user is offline), the local master data file is reconfigured to read-only. Thereafter, the next time a user logs in to a shared space and the shared space application 108 connects to the read-write master file, the read-write master file is copied over (e.g. replaces) the local read-only master file so that the master file is updated with all the additions and changes that occurred while the user was disconnected.

Accordingly, as updates to the shared space occur, each master file is updated and/or synchronized with the other associated master files for the shared space. Thus, the shared space application 108 operates to ensure that users who are currently in communication (e.g. connected and/or signed on) with one another see the same information. The shared space application 108 is configured to modify the master file and communication of the shared space is provided by using the master file when a user is in communication with another participant and associated master file. For example, the communication of the shared space can be provided when a user has network connectivity to an associated master file through an online storage service and/or directly to other associated computing devices (e.g. peer-to-peer).

As described above, the shared space application 108 can be configured to maintain a read-only copy of a latest version the master file in local storage of an associated computing device. If a user is offline, the shared space application 108 does not provide access to the read-only master file. However, the user can view the read-only copy of the master file, but cannot make changes to the master file. As described below, the user can also save one or more expressions stored in the read-only master file to a scrapbook. If another user changes the master file associated with a shared space while a user is offline, the offline user will not see the changes until they log back in to the associated shared space. Thus, a user must be logged into a shared space so that the shared space application 108 can access and use the read-write master file to update the shared space with any changes since the user has been offline.

As an example, suppose user A and user B have a shared space. User A is online. When user A opens the shared space, the shared space application accesses the master file. As one example, the shared space application can access the master file from a virtual hard drive. Then, user A adds a picture to the shared space. The shared space application adds the picture to the master file and the local read-only file of user A. User B is offline, and opens the shared space, which shows that user B is offline. User B cannot see the picture that user A just added. Thereafter, user B goes online, such as be connecting to the Internet. Once user B goes online, the shared space application accesses and reads the master file, and updates the local read-only file on user B's machine. Now user B sees the picture added by user A to the shared space.

In one embodiment, the read-write master file is stored and maintained on the serving computing device 107. Thus, a user associated with a shared space needs to have network connectivity and be online to make changes to the shared space and associated read-write master file. In other embodiments, the master file can be stored and maintained using a web service, on a peer machine, and/or on the user's computing device. The master file can then be copied to all participants associated with a shared space when they are communicating. In an alternative embodiment, a user can make additions and/or changes to their local file at any time. Thereafter, when each participant re-connects to a shared space (e.g. logs in) or to another participant (e.g. peer-to-peer), a synchronization operates to aggregate all off-line changes made by each participant so that each participant "sees" the same space.

Figure 2:
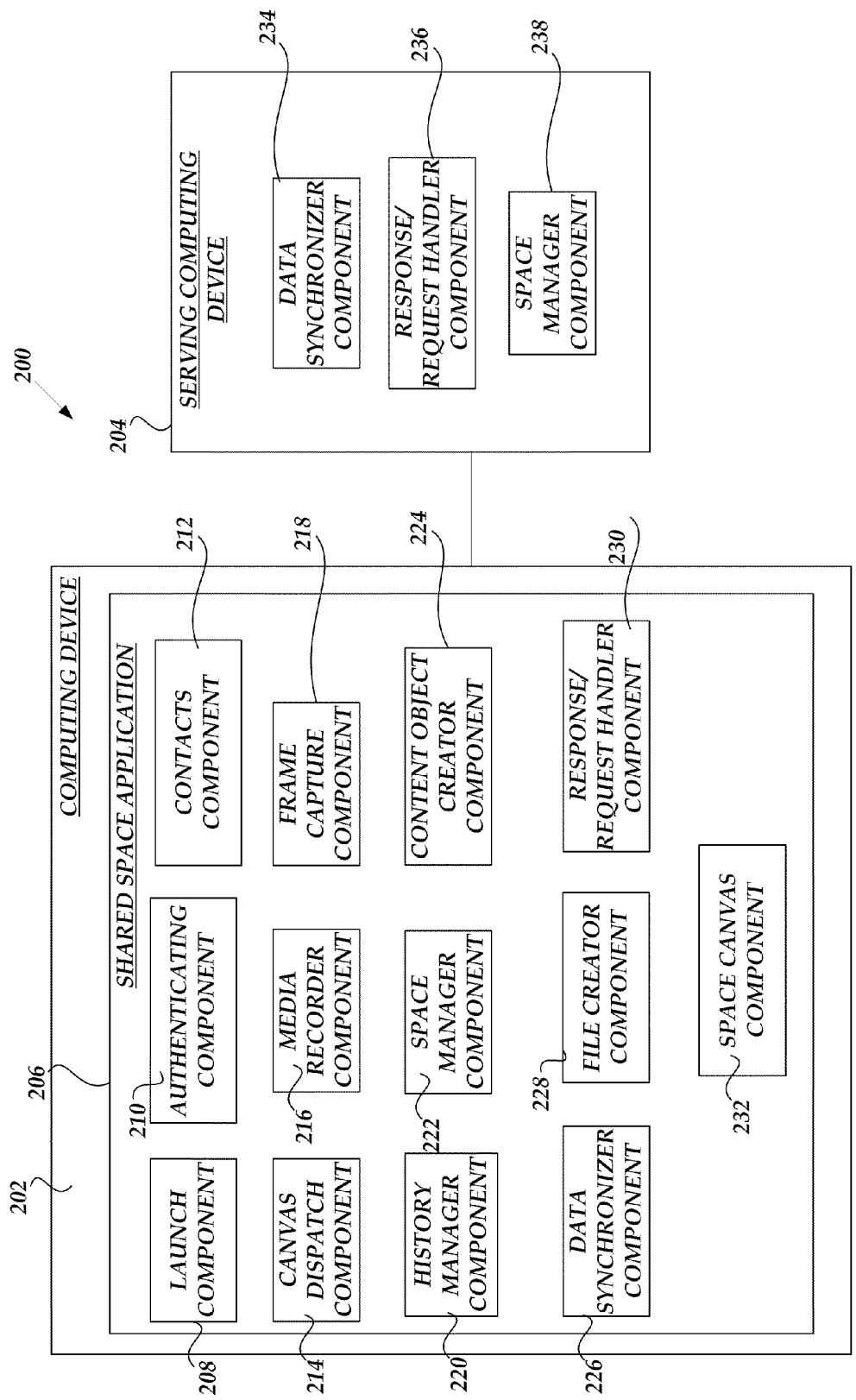
FIG. 2 is a block diagram of a computing environment.

FIG. 2 is a block diagram of a computing environment 200, under an embodiment. The computing environment 200 includes a computing device 202 in communication with a serving computing device 204. The components of the computing environment 200 can be communicatively coupled to one another using wired, wireless, combinations of wired and wireless, and other communication and networking techniques. While one computing device 202 and one serving computing device 204 are shown, other embodiments can include a plurality of such computing and serving computing devices. In one embodiment, a shared space can be created and defined between at least two users using two computing devices, such as ultra-mobile computing devices for example.

As shown in FIG. 2, the computing device 202 includes a shared space application 206. The shared space application 206 is configured to provide a persistent space that can be shared for interaction by a number of users. According to this embodiment, the shared space application 206 includes a number of associated components that are used to maintain a space. The shared space application 206 includes, but is not limited to: a launch component 208; an authenticating component 210; a contacts component 212; a canvas dispatch component 214; a media recorder component 216; a frame capture component 218; a history/scrapbook manager component 220; a space manager component 222; a content object creator component 224; data synchronizer component 226; a file creator component 228; a response/request handler component 230; and, a space canvas component 232. In alternative embodiments, the functionality and operation of the various components can be combined to provide fewer components and/or a desired implementation.

The launch component 208 can be configured as a user interface and operated to provide user authentication, space selection, and/or participant selection. The authenticating component 210 can be configured and operated as an authenticating service, such as a PASSPORT service for example. The contacts component 212 can be configured and operated to locate and/or maintain a user contact list. For example, the contacts component 212 can be configured to connect to a MSN service to expose a user's MSN contact list as participants for shared spaces. The canvas dispatch component 214 can be configured and operated to create a new space canvas and display objects in a space. The media recorder component 216 can be configured and operated to record audio, images, video, and other objects/expressions. For example the media recorder component 216 can use a local camera, microphone, and/or other components to record images, audio and video as expressions in a space.

With continuing reference to FIG. 2, the frame capture component 218 can be configured and operated to capture "snapshot" images of a space for the history and/or scrapbook. The history/scrapbook manager component 220 can be configured and operated to manage a chronological collection of "snapshots" of a space and to provide the user a mechanism to review and/or store selected expressions in a private local repository referred to as a scrapbook. The history/scrapbook manager component 220 can record every event occurring in a space. Accordingly, a user does not have to continually use save operations, which allow for a more informal interaction with the space. The space manager component 222 can be configured and operated to manage aspects of a space. For example, the space manager component 222 can be configured and operated to manage a local copy of a master file. The content object creator component 224 can be configured and operated to manage objects and other expressions in a space. For example, the content object creator component 224 can be configured and operated to manage images, ink, text, and/or other user expressions.

The data synchronizer component 226 can be configured and operated to synchronize data files between a user computing device 202 and a serving computing device 204. For example, the data synchronizer component 226 can be configured and operated to synchronize master data files between the user computing device 202 and serving computing device. The file creator component 228 can be configured and operated to manage shared space data files, including, but not limited to: creating, opening, and saving shared space data files. The response/request handler component 230 can be configured and operated to manage communication between computing devices. For example, the response/request handler component 230 can be configured and operated to manage communication between the computing device 202 and the serving computing device 204. The space canvas component 232 can be configured and operated as a user interface to enable user interaction with a space.

In accordance with this embodiment, the serving computing device 204 includes a number of shared space components. As shown in FIG. 2, the serving computing device 204 includes, but is not limited to: a data synchronizer component 234; a response/request handler component 236; and, a space manager component 238. The data synchronizer component 234 can be configured and operated to synchronize data files between the serving computing device 202 and one or more user computing devices. For example, data synchronizer component 234 can be configured and operated to synchronize master data files between the serving computing device 204 and user computing device 202. The response/request handler component 236 can be configured and operated to manage communication between the serving computing device and one or more other computing devices, including other serving computing devices. The space manager component 238 can be configured and operated to manage aspects of a space. For example, the space manager component 238 can be configured and operated to manage a read-write master copy of a master file. Other embodiments are available.

The shared space application 206 is configured to use and provide various objects in a shared space. In one embodiment, the shared space application 206 uses and provides: participant indicators (e.g. icon, digital image, etc.) that represent other users who are sharing a space; expressions in the space (e.g. ink, text, photos, video, live connections, etc.); and, a number of interactive tools. For example, an icon (e.g. default person/group icon) or a digital image can be used to represent an individual or group that is sharing a space. A digital image or photo can be imported or dropped using the contacts component 212 along with a name associated with individual or group name. The contacts component 212 can be configured to propagate name/photo updates/changes to the shared space application 206. An individual participant indicator can include an indication of a participant status or state (e.g. present, occupied, not present, etc). A group participant indicator can also include a count of participants in each state (4 of 12 present, etc). When a user taps a participant indicator, a live connection is established (e.g. audio and/or video depending on available device hardware and service features), as described below.

Expressions include any participant created item in a space including ink, images, text, video, live connections, etc. For example, a participant can use a tablet pen to draw a picture or write some text. The user can also use a finger and a touch-screen to ink in a space for example. In an embodiment, an expression can include three states: normal, focus, and magnify, but is not so limited. In the normal expression state, new expressions appear on top of old expressions (except for live connections which always appear on top). Previously kept live connections can be represented by a live connection indicator, such as a live connection icon for example. Text expressions can be scrolled by touching in the text area and dragging up/down. Giving focus to an expression (or group of expressions) in a shared space operates to display a marquee around the item.

Table 1 below lists a number of expressions and how each expression receives focus.

TABLE 1

| Expression | Gets focus when tapped from . . . |
|---|---|
| Ink | Select Tool |
| Image | Select Tool |
| Video | Select Tool |
| Audio (music) | Select Tool |

TABLE 1-continued

| Expression | Gets focus when tapped from . . . |
|---|---|
| Text | Select Tool |
|  | Text Tool |
| Live Connection Icon | Select Tool |
| Group of Expressions | Select Tool |

In the focus state, individual expressions (individual select) or group of expressions (group select) can have focus. When an expression (or group of expressions) has focus, it is temporarily displayed on top of other expressions, including a surrounding marquee, magnify button, and move grip. Losing focus returns the expression (or group) to its former position in view order. A user can drag the marquee to move (e.g. drag from center, or move grip), resize the expression (e.g. drag from edges and corners), and rotate (e.g. drag move grip or rotation handle).

In one embodiment, any change to an expression (e.g. move, resize, rotate) operates to move the changed expression to the top of view order. Changing focus to an expression without making any changes to the expression operates to return the expression to its former position in view order. The user can clear focus by tapping a blank area of a shared space or selecting another expression. Expressions that are pasted to a shared space are automatically given focus.

A user can tap the magnify button which operates to change the expression view to the magnify state. In the magnify state, the expression is magnified to encompass a substantial portion of a display (tools remain visible). An expression cannot be moved, resized, or rotated in the magnify state. A user can tap the close button which operates to return the expression to the focus state.

Table 2 below lists a number of contextual controls and information associated with various expressions.

TABLE 2

| Expression | Controls | Info (Meta-data) |
|---|---|---|
| Ink | Close | Timestamp |
|  | Save copy in Scrapbook | Author (>2 Participants only) |
|  | Delete |  |
| Image | Close | Timestamp |
|  | Save copy in Scrapbook | Author (>2 Participants only) |
|  | Delete | Size |
|  | Crop (Tool) | Location (if recorded) |
| Video | Close | Timestamp |
|  | Save copy in Scrapbook | Author (>2 Participants only) |
|  | Delete | Size |
|  | Crop | Location (if recorded) |
| Audio (music) | Close | Timestamp |
|  | Save copy in Scrapbook | Author (>2 Participants only) |
|  | Delete | Size |
|  | Crop |  |
| Text | Close | Timestamp (sub-statements within Expression) |
|  | Save copy in Scrapbook |  |
|  | Delete | Author (sub-statements within Expression) |
| Live Connection | Close | Participant(s) |
|  | Save copy in Scrapbook | Timestamp |
|  | Delete | Size |
|  | Play | Duration |
|  | Stop | Current position in recording |
|  | Pause |  |
|  | Rewind |  |
|  | Fast Forward |  |
| Group of Expressions | Close | Aggregate Size |
|  | Save copy in Scrapbook |  |
|  | Delete |  |

The tools of the shared space application are configured to facilitate the sharing of photos, video, audio, ink, text, and other user expressions. The tools can be used to create, select, modify and save expressions. In one embodiment, the tools are provided via the space canvas component 232 and are configured as a number of buttons (e.g. touchscreen buttons, tablet buttons, icons, etc.). The button types include, but are not limited to: a toolset tray button: expands/collapses toolset tray; a toolset button that selects a tool and then collapses the toolset tray; a tool button that activates control (for modal buttons) or expands/collapses a palette (for palettes); and a palette button that selects item/mode/choice from a palette and closes the palette. The appearance of a tool button can change to reflect current palette selection.

Table 3 below lists each toolset, tools, and palettes, under an embodiment.

TABLE 3

| Toolset | Tool | Palette |
| --- | --- | --- |
| Ink | Pen (default) | |
| | Magnify pen | |
| | Ink thickness | Thickness Palette |
| | Ink color | Color Palette |
| | Stroke Eraser | |
| Get stuff from . . . | My Pictures (default) | |
| | My Videos | |
| | My Music | |
| | Scrapbook | |
| | History | |
| Text | Text (default) | |
| | Style | Style Palette |
| | Size | Size Palette |
| | Color | Color Palette |
| | Font | Font Palette |
| Select | Individual select (default) | |
| | Group select (bounded Expressions) | |
| | Copy | |
| | Paste | |
| | Undo | |
| Scrapbook | | |

The shared space application 206 and associated tools allow a participant to interact with a space and locate expressions wherever desired in the space. Moreover, space participants are free to interact with a space at their convenience. There is no rigid communication requirement or protocol (e.g. User 1 communication followed by User 2 communication followed by User 3 communication, etc.).

As described above, the shared space application 206 is configured to provide a live connection between participants of a shared space. In an embodiment, a live connection is configured to behave as an expression with a few exceptions. A live connection can be used to engage in (and store) live audio/video conversation (e.g. like a video conference), or to record a message for another participant (e.g. like voicemail or videomail). In either case, the methods and controls are the same. When a live connection is opened by tapping a participant icon, the user is prompted to select a type of live connection. The type of live connection depends on a type of service subscription.

Table 4 below lists the subscription types for live connections of an embodiment.

TABLE 4

| Subscription Type | Live Connection with a Participant | Live Connection with Group or multiple Participants |
| --- | --- | --- |
| Basic | Audio Video | Record audio and leave as a message in shared space. Record video and leave as a message in shared space. |
| Premium | Audio Video | Combined audio. Separate video stream for each participant. |

The live connection is configured to provide local ("me") and remote ("you") views. In a Group live connection, there is a "you" view for each member of the group. While a live connection is open, a number of controls and information is provided. Duration information is provided to show the duration (e.g. minute:seconds) of a live connection. A mute button is provided (for both audio and video) which operates to mute a device microphone and camera so that others cannot hear or see you. A close button, which when tapped, operates to prompt the user to select either "Cancel", "Keep" or "Erase". Selecting cancel returns to the live connection as if the close button had not been tapped. Selecting keep places the live connection in the associated space, and is represented by a live connection icon. Selecting erase discards a buffered live connection.

The shared space application 206 is also configured to provide a scrapbook using the history/scrapbook manager component 220. The scrapbook provides a convenient private storage for expressions and space snapshots. The scrapbook can be opened by tapping a scrapbook tool. The scrapbook is configured to provide multiple views (e.g. list, icon, thumbnail, etc.) and grouping/sorting (e.g. by participant, by date, by expression type, by location, etc). The scrapbook also includes a search/filter tool for locating expressions and other items in the scrapbook.

Any expression or space snapshot can be stored in the scrapbook. The scrapbook includes a "Save Space" button which operates to save a snapshot copy of a current space into the scrapbook in image form. Contents of the scrapbook are stored in a folder named "My Scrapbook" in the operating filesystem. "My Scrapbook" is a peer to "My Pictures", "My Notebook", and "My Music". The "My Scrapbook" folder can be created when the Shared Space application is installed. Expressions in scrapbook have the same three states (Normal, Focus, Magnify) and all the same respective controls and behaviors as they do in a space except the following controls are changed/added: Move, Resize, Rotate are not available; "Save copy to Scrapbook" is replaced with "Copy to Space"; "Print" button prints an expression or a space snapshot.

The "Get Stuff" toolset is configured to provide a convenient way to browse and import items from the operating file system into a space. The "Get Stuff" toolset can be used to browse and import items from various folders, such as My Pictures, My Videos and My Music for example. Tapping the "My <Stuff>" tool from the "Get Stuff" toolset opens a viewer to browse the contents of the respective <stuff> folder in the operating file system. Multiple views are provided (e.g. list, icon, thumbnail, etc) and grouping/sorting (e.g. by Participant, by date, by Expression type, by location, etc). A search/filter tool is also provided. Expressions have the same three states (Normal, Focus, Magnify) and all the same respective controls and behaviors as they do in a space except the following controls are changed/added: Move, Resize, Rotate are not available; "Save copy to Scrapbook" is replaced with "Copy to Space."

The shared space application 206 is also configured to provide a history using the history/scrapbook manager component 220. In one embodiment, the history is maintained and accessed from the serving computing device 204. The history can be configured as a simple read-only temporal view of a space. In an embodiment, a space history can be displayed in full screen with the following controls: Individual select (default); Group select (bounded Expressions); and, Copy. In another embodiment, the history can be displayed as a list, thumbnails, etc. The history view includes a horizontal scrollbar that can be used to control time (e.g. occupies Tool tray space). Expressions in history have the same three states (Normal, Focus, Magnify) and all the same respective information displayed, but none of the modification controls. Additionally, "Save copy to Scrapbook" is replaced with "Copy to Space".

In an embodiment, the shared space application 206 can be configured to provide three interfaces for accessing automatically stored strokes, segments, and other expressions. The first is infinite undo and redo. Using undo and redo, a user can access any past state of the segment. Second is the time slider. Using the time slider, a user can specify the time point directly, or use jump buttons to get to discrete "interesting" time points. Third is a context-based search, which can be implemented as a behavior. The search behavior allows a user to retrieve previous strokes, segments, and other expressions based on context information such as time, segment location, segment size, ink colors, etc. The search results are shown as a set of thumbnails on the screen, and a user can access a point in history by clicking on a thumbnail.

Figure 3:
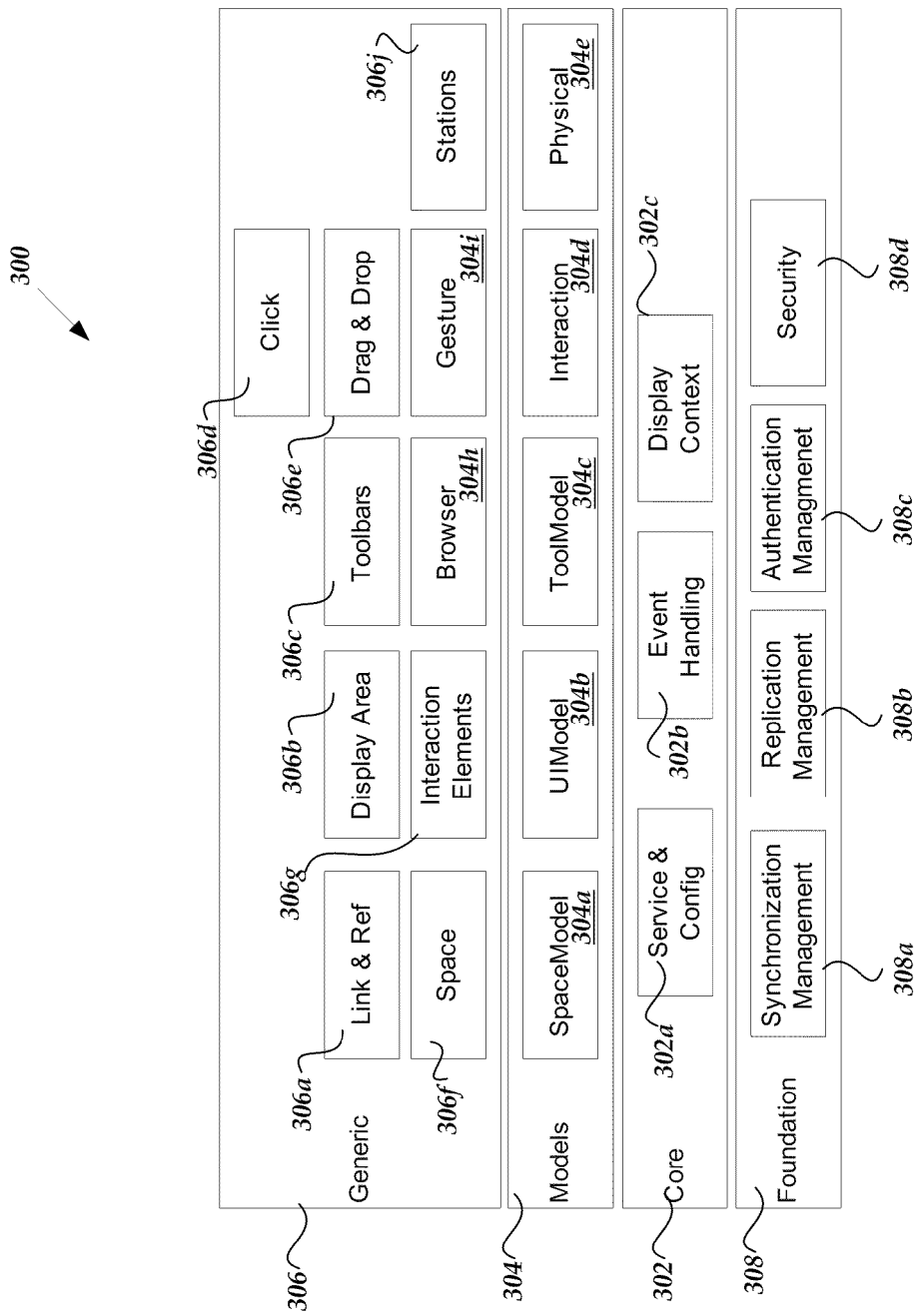
FIG. 3 is a block diagram of a shared space architecture.

FIG. 3 is a block diagram of a shared space architecture 300, under an embodiment. The shared space architecture 300 can be configured as a layered architecture, including a core layer 302. The core layer includes a service and configuration component 302a, an event handling component 302b, and a display context component 302c.

A model layer 304 defines the basic interfaces for documents, user interface, tools, and interaction styles. The model layer 304 includes a space model component 304a, a user interface model 304b, a tool model 304c, an interaction component 304d, and a physical component 304e. The model layer 304 includes interfaces and abstract classes that define the abstractions of shared space components. The model layer 304 can be separated from the generic layer 306 to ensure extensibility, flexibility, reusability, and interoperability of modules and components.

The space model component 304a defines the base classes and functionality of objects that can be part of a space. The user-interface model 304b defines an alternative user-interface concept suitable for roomware components. The tool model 304c provides additional functionality to the space. Prominent examples are toolbars or browsers. Space browsers have a role in providing the connection between the user interface and the space. Additionally, the tool model 304c controls the possible work modes, like the degree of coupling for example. The physical model is the representation of the parts of the "real" world relevant to shared space. For example, the term "station" refers to the computers running a shared space application. The interaction component 304d supports different styles of interaction, including defining different interaction styles.

A generic layer 306 can provide functionality for interacting and communication, such as in team work, meeting, and other situations. The generic layer 306 includes a link and reference component 306a, a display area component 306b, a toolbars component 306c, a click component 306d, a drag and drop component 306e, a space component 306f, an interaction component 306g, a browser component 306h, a gesture component 306i, and a stations component 306h. The generic layer 306 includes standard data types like text, graphics, and informal handwritten input, as well as private and public workspaces for generic collaboration support for example.

The instances of hypermedia data model classes are included as part of the shared object space. Accordingly, users can access these objects simultaneously. The generic document elements include workspaces (the equivalent of a page), handwritten input (scribbles), texts, and images. The main elements of the user-interface include segments and overlays. The interaction can be divided into "segments", which defines the space available for a tool, such as a document browser for example. In addition, "overlays" can be positioned freely. Document browser and toolbars are provided by the generic layer 306.

For the interaction with components, there are interaction techniques available besides using a mouse and keyboard. These techniques include gestures written with a pen or finger, and support for drag and drop. To generate the gesture events mentioned above, each stroke that is drawn can be sent to a gesture recognizer. The shared space architecture 300 also includes a foundation layer 308 having a synchronization component 308a, a replication component 308b, an authentication component 308c, and a security component 308d.

Figure 4:
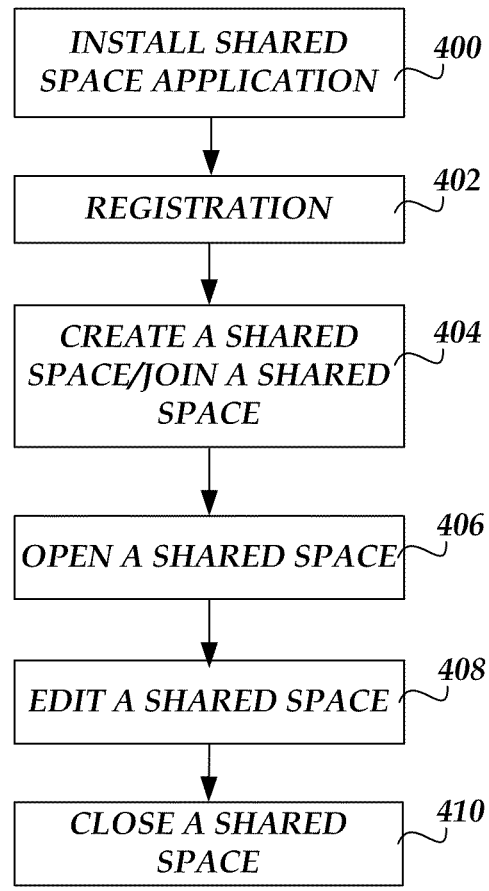
FIG. 4 is a flowchart illustrating using a shared space.

FIG. 4 is a flowchart which illustrates a procedure for using a shared space application, under an embodiment. As described above, the shared space can be shared between two or more users. The shared space can be updated in accordance with any participant changes when a user is online and the respective computing devices are in communication with one another. Once a user becomes a participant to a shared space, the user can interact and communicate in a variety of ways with another participant or participants of the shared space, as described above.

At 400, the shared space application is installed on the user's computing device. At 402, the user is prompted to register before using the shared space application. Profile information associated with the user is collected and can be stored on a serving computing device or locally as part of the registration process. At 404, after registering, the registered user can create or join a space to share with other registered users. Each space can have a unique name to identify the space. After creating a space, the space initiator can invite a number of other users to join the created space. The user can use the contacts repository (e.g. messenger contacts ("buddies"), OUTLOOK contacts, WINDOWS VISTA contacts, etc. or an aggregation of contacts) to identify potential users to share the created space. Once the user has invited another user to join a space, the shared space application is configured to send an invitation message to the invitee. The invitee could receive the invitation message via e-mail, IM, SMS, the shell application on an ultra-mobile PC, and/or via the shared space application the next time the invitee opens the shared space application and is in communication. Each invited user can accept the invitation to create a replicated space file locally.

At 406, a shared space is opened and a persistent whiteboard canvas is presented to the user. If the user is online, any participant changes made to the canvas are automatically updated and presented to the user. At 408, a participant can use a number of shared space tools to add an expression, modify an expression, or otherwise interact with the canvas of the shared space. Each online participant sees the interaction by other participants and the updated space canvas. If a user is offline, but comes back online after changes are made by another participant, the participant's canvas is then updated to show the changes. Additionally, each participant can save any object in the space to a local scrapbook. In an embodiment, the scrapbook is space independent, but can be used with any space. As described above, the shared space application also tracks and maintains the process of space modification using a historical record or history. A participant can use the historical record to recall any step at any time.

As described above, real-time data synchronization (e.g. after a participant's interaction, after coming online and opening a shared space, etc.) can be provided by the shared space application and associated components so that all online participants are able to "see" the same persisted space, in the form of a space canvas. The synchronization process depends in part on the type of communication network that the participants are using to communicate. For example, a peer-to-peer communication network uses a different synchronization process as compared to a synchronization process between a number of participant computing devices and a serving computing device. At 410, a user closes a space, and the connection(s) between the user's computing device and other participant computing devices are automatically closed. Thereafter, the graphical user interface (GUI) and other utility resources associated with a space canvas are released.

Figure 5A:
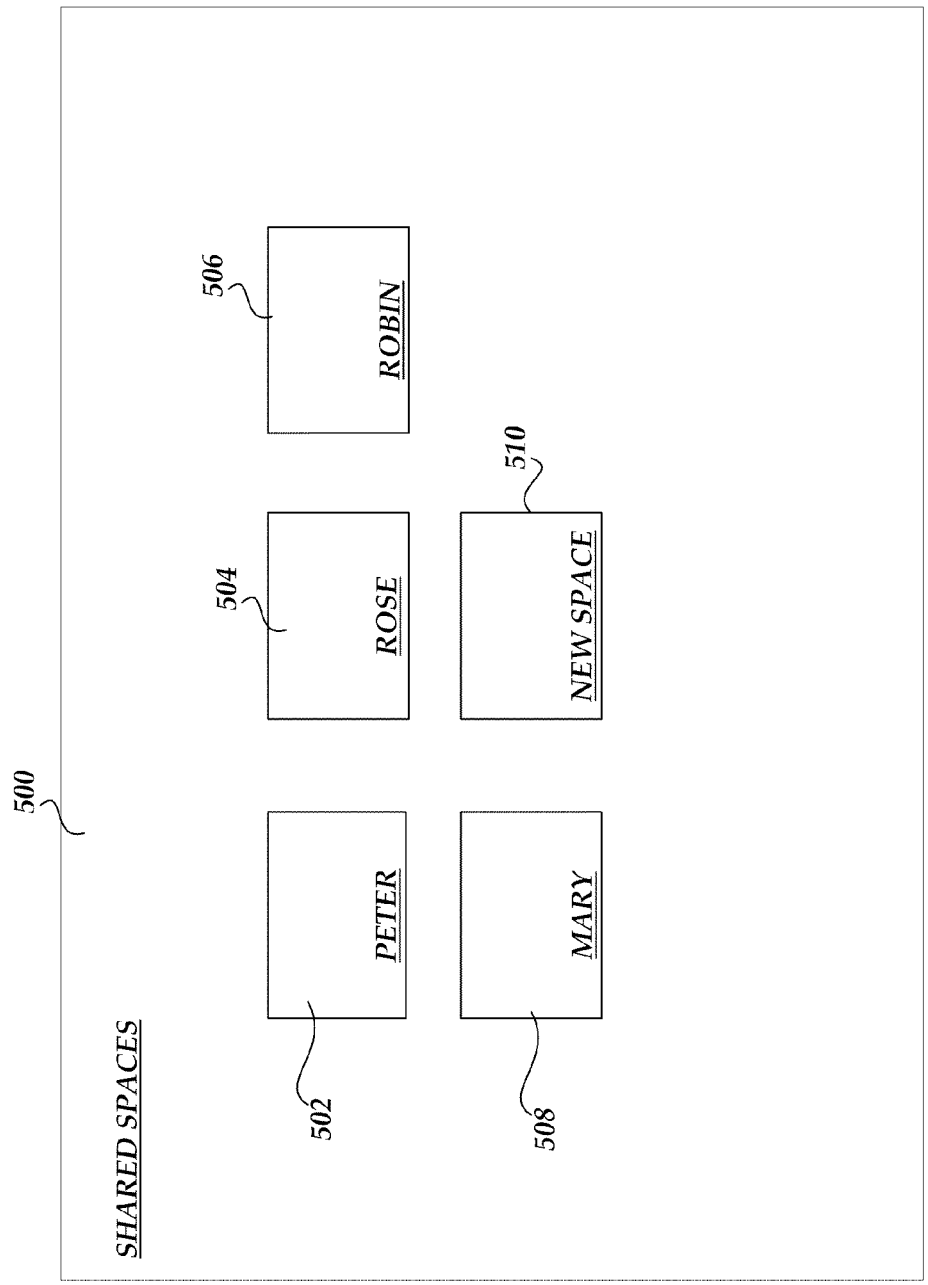

Referring now to FIGS. 5A-5K, block diagrams illustrate a user interface for accessing and interacting with a shared space, under an embodiment. As shown in FIG. 5A, a user interface 500 depicts a number of shared spaces associated with the current user of the shared space application. The user interface 500 is shown after the user has successfully completed an authentication process (e.g. username, password, and other login credentials). The user interface 500 shows that the user has a number of contacts that are associated with one or more shared spaces. As shown, the user has shared spaces with contacts that include Peter 502, Rose 504, Robin 506, and Mary 508. The user interface 500 also includes a block for defining a new space for an associated contact 510. As described above, each contact 502-508 associated with a shared space can include a participant picture or other identifying indicia that the user can use to personalize the spaces.

Figure 5B:
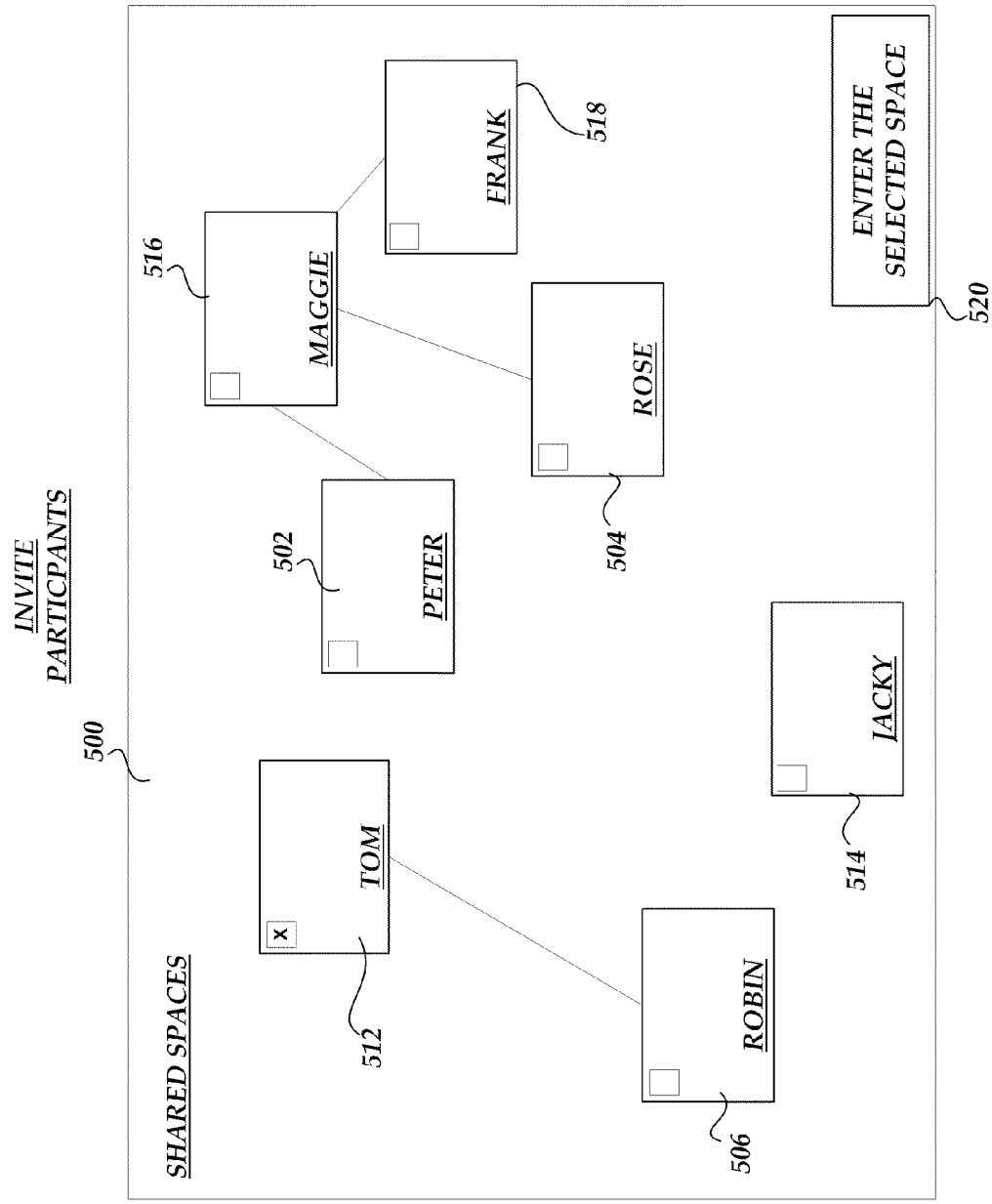

FIG. 5B is a block diagram of a user interface 500 which illustrates a number of shared spaces. The connecting lines between the various contacts define a number of shared spaces. For example, Robin 506 and Tom 512 define a shared space with the user. Jacky 514 defines a shared space with the user. Peter 502, Rose 504, Maggie 516, and Frank 518 define another shared space with the user. As described above, the user can use the shared space application to define a number of shared spaces to keep in touch and otherwise interact with select participants.

As shown in FIG. 5B, the user has selected Tom 512 (the "x" highlights the user selection) for interaction in a shared space. The user has not selected Robin 506, so the interaction will be solely with Tom 512, until the user invites Robin 506 for this space or opens a different space. After selecting Tom 512, the user can use the button 520 to enter the space. At this point, if Tom is online, a notification is sent to Tom 512 to join the associated space. If Tom is offline or does not have his shared space application open, the notification will be communicated when Tom opens the shared space application and goes online.

FIG. 5C shows the user interface 500 after the user has elected to share the space with Tom 512. A status indicator 522 shows that Tom 512 is "online." As shown in FIG. 5C, the space canvas 524 is blank. That is, neither Tom 512 nor the user has added anything to the space canvas 524. A number of tools 526 are presented to the user for interacting with the space canvas 524.

FIG. 5D shows the user interface 500 in a state wherein the user can select from a number of objects (e.g. pictures, videos, audio, etc.) for which to include in the shared space with Tom 512. The objects 528-538 can be selected from local storage, a peer source, or some online source. As shown in FIG. 5D, the user has selected object 528 to insert on to the space canvas 524. That is, the inserted object 528 is an expression provided by the user. Tom 512 sees the object 528 on his space canvas in real-time since he is online. In one embodiment, the user can also use a slideshow button 540 to insert a slideshow on to the space canvas 524. Once the user has selected one more objects, the user can use the insert button 542 to insert the one or more objects on to the space canvas 524.

Figure 5G:
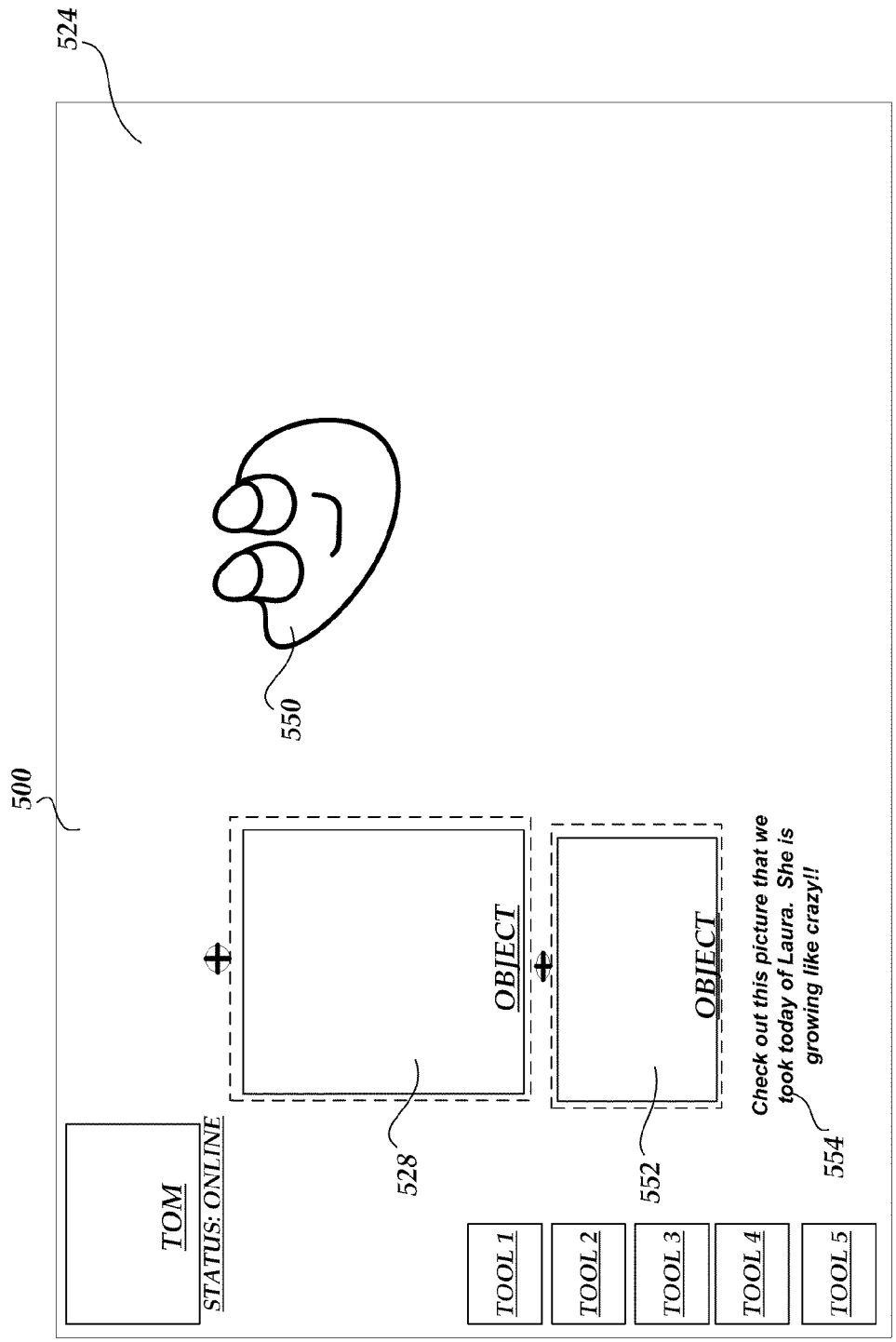

FIG. 5E shows the user interface 500 after the user has selected an object 528 and inserted the object on to the space canvas 524. Once the user has located the object 528 on the space canvas 524, a number of additional context relevant tools 544 are made available to the user for interacting with the inserted object 528. Additionally, the user can use handles 546 and 548 to expand/contract and/or rotate the object 528. FIG. 5F shows the user interface 500 after Tom 512 has drawn an ink drawing 550 onto the space canvas 524. The user was able to see the ink drawing 550 at each stage of its creation by Tom 512. FIG. 5G shows the user interface 500 after Tom 512 has inserted an object 552 on to the space canvas 524. Tom has also typed in some text 554 below his inserted object 552. As described above, the user and Tom 512 are seeing the same interaction and information on their respective displays, such as a touchscreen interactive display for example.

Figure 5H:
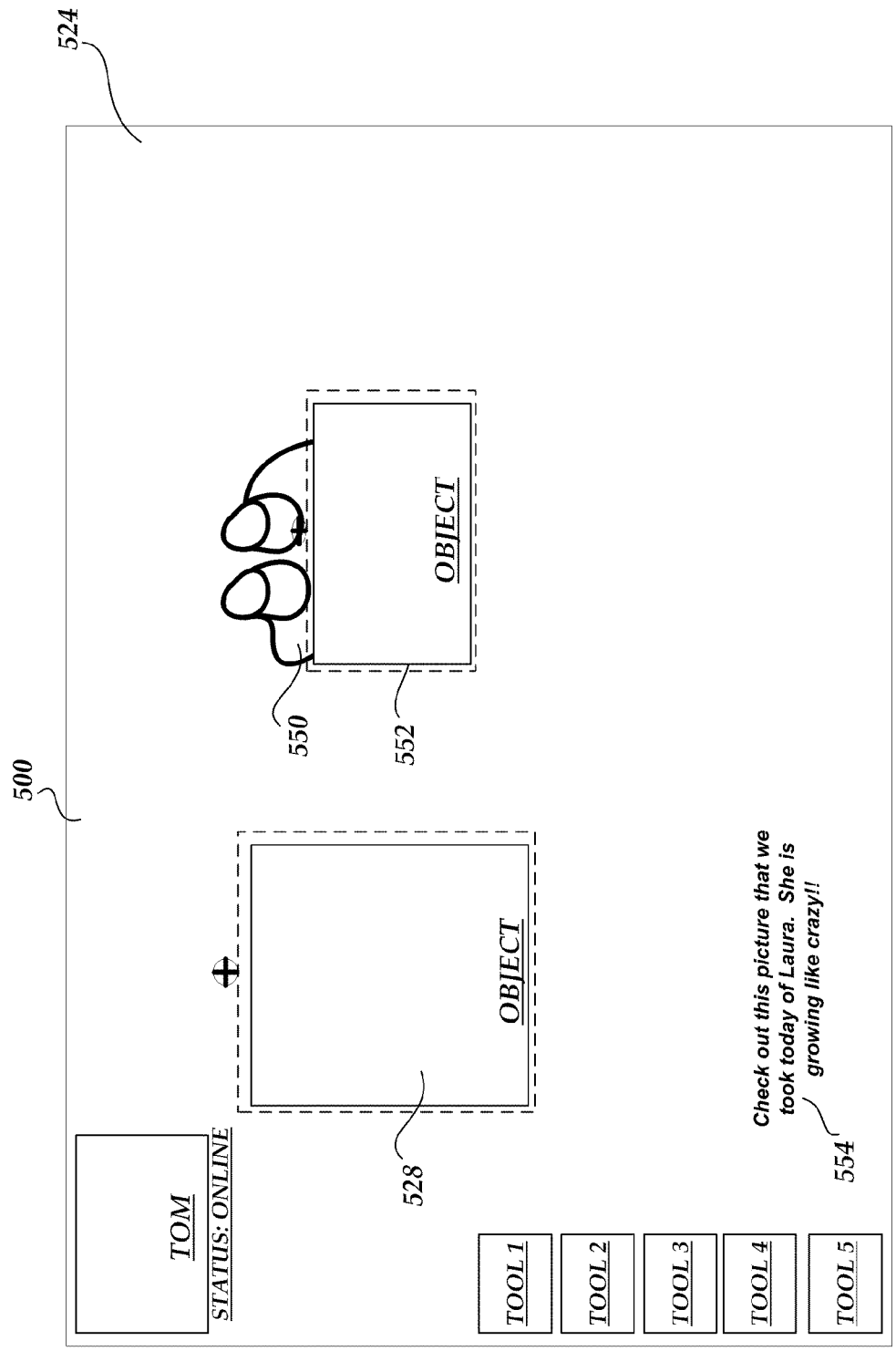
Figure 5I:
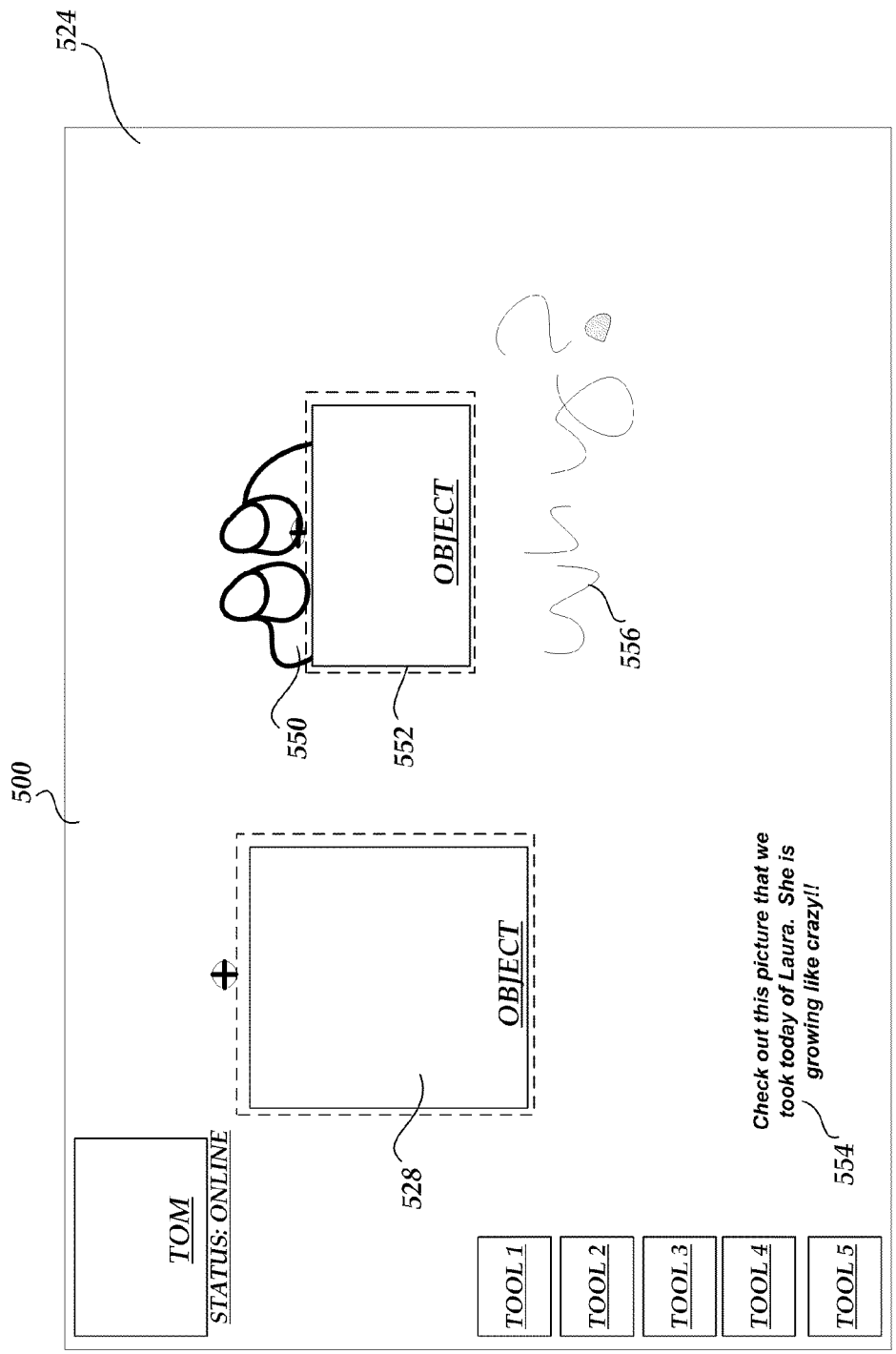

As described above, the shared space application allows each participant to freely interact with a shared space. FIG. 5H shows the user interface 500 after the user has moved Tom's inserted object 552 to a new location on the space canvas 524. The ink 550 is now partially covered by the relocated object 552. FIG. 5I shows the user interface 500 after Tom 512 has inked 556 a question asking why the user moved the object 552.

Figure 5J:
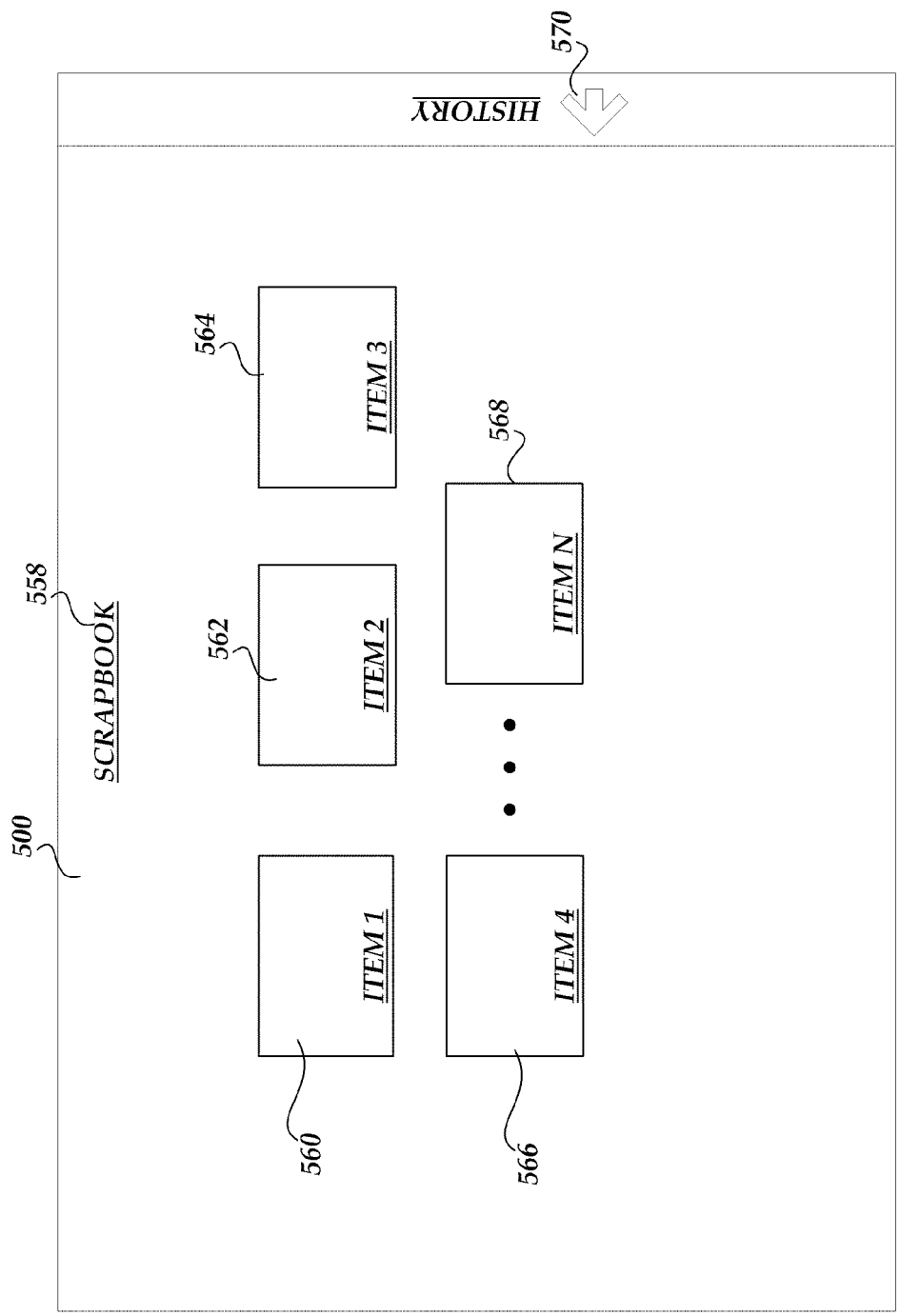
Figure 5K:
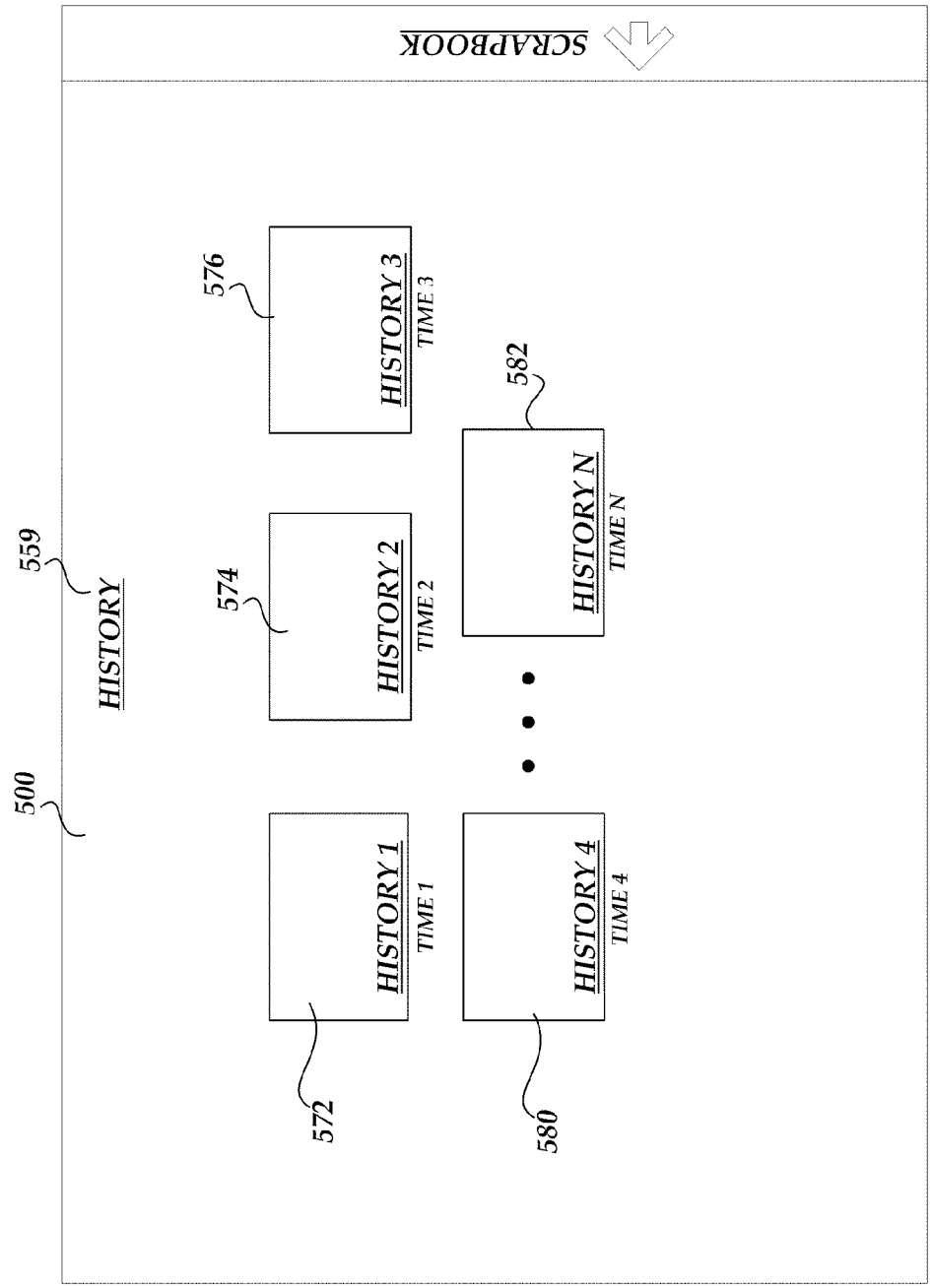

FIG. 5J shows the user interface 500 in a scrapbook view 558. The user has saved a number of items 560-568 to the scrapbook. In one embodiment, the content(s) of the scrapbook is saved locally to the user's computing device. The user interface 500 also includes a button 570 that the user can click on to go to the history view. FIG. 5K shows the user interface 500 in a history view 559. The history includes a number of history details 572-582 that have been recorded by the shared space application and represent participant changes and interaction with the space and space canvas 524. The user can also use the user interface 500 to mark a time in history for saving in addition to the automatic saves. In one embodiment, the history is saved to a serving computing device and made available to a user when connected and online.

As described above, in an embodiment, a shared space application can be included or installed on a computing device and be associated with a serving computer for managing aspect of a shared space. For example, the shared space application can be installed on an ultra-mobile personal computer. The portability of the ultra-mobile PC enables users to use the shared space application in an immediate, convenient, and readily accessible manner. A shared space application can be configured to provide a shared space to allow a number of users to communicate and interact with one another. A space can always be made available to all participants of the space, regardless of whether there is a network connection. That is, a participant is free to interact with the space once a space is created, even when the participant is not currently connected or online. Any changes are updated to other participant spaces when the participant is connected and/or goes online.

Moreover, the shared space application enables any space participant to add, modify, create, etc. an expression at any time without requiring other participants to join a session. Accordingly, the shared space application allows a degree of freedom, allowing all participants to express themselves whenever they choose. Likewise, the shared space application allows expression recipients the freedom to respond whenever they choose. There is no direct or implied obligation to respond immediately.

The shared space application can provide a persistent canvas wherein all participant expressions are visible on a single display. For example, a display of an ultra-mobile personal computing device can be used to display a shared space, wherein user expressions can be persisted within the display. A user does not have to scroll forward and back to find desired information since the expressions are contained within a visible area of the space canvas and display (including hidden expressions). The shared space is configured to be substantially visually identical for all participants who are online and have the space open.

Additionally, the shared space application is configured to enable all participants to see edits and other modification to a shared space in real-time or substantially in real-time (e.g. depending on connectivity, bandwidth, and other factors). A user can use a pen or finger to draw any handwritten stroke anywhere in the space by dragging the pen or finger on the space canvas (termed "stroking"). A user can erase by drawing a scribbling stroke with the stylus's modifier button down (termed "metastroking") or a finger. The shared space application is configured to allow all of the participants see the editing process as it occurs. For example, the participants can see the characters as they are typed (e.g. you see corrections), ink as its drawn (and erased), etc. Thus, the shared space application creates a sense of presence that is lacking in many other applications.

As described herein, a shared space provides a mechanism for users to keep in touch using emotionally expressive and/or passive communications, but is not so limited. As business relationships, families, and friendships spread over greater distances, the shared space provides a convenient way to communicate without being a hassle and obtrusive. For example, consider a family, wherein the family members reside in different parts of the country. The entire family can communicate and participate with one another by using a shared space. Siblings can post photos of significant life events, or just common daily occurrences. Other family members can also use the shared space to comment on the photos, ask for advice, and/or share ideas. The interaction flows naturally as annotations, drawings, personal notes, video, and/or audio clips are added by the various participants. Whenever multiple participants happen to be viewing a shared space, they can also serendipitously engage in a live conversation.

As another example, consider a business made up of multiple business units that rely on one another to provide important services to consumers. The business units are located in different parts of the world. Rather than using unreliable e-mail or telephone communication, each employee of the business has a shared space application running on an ultra-mobile personal computing device. The employee can strategically set-up and monitor one or more shared spaces between important counterparts of the business. For example, a product group can set up a shared space for communicating with strategic business planners for the launch of a new device. The interaction flows naturally as annotations, inking, drawings, images, personal notes, video, and/or audio clips are added by the various participants. Users can also use the shared space application to engage in live audio and/or video conversation if the parties happen to be available at the same time.

Exemplary Operating Environment

Figure 6:
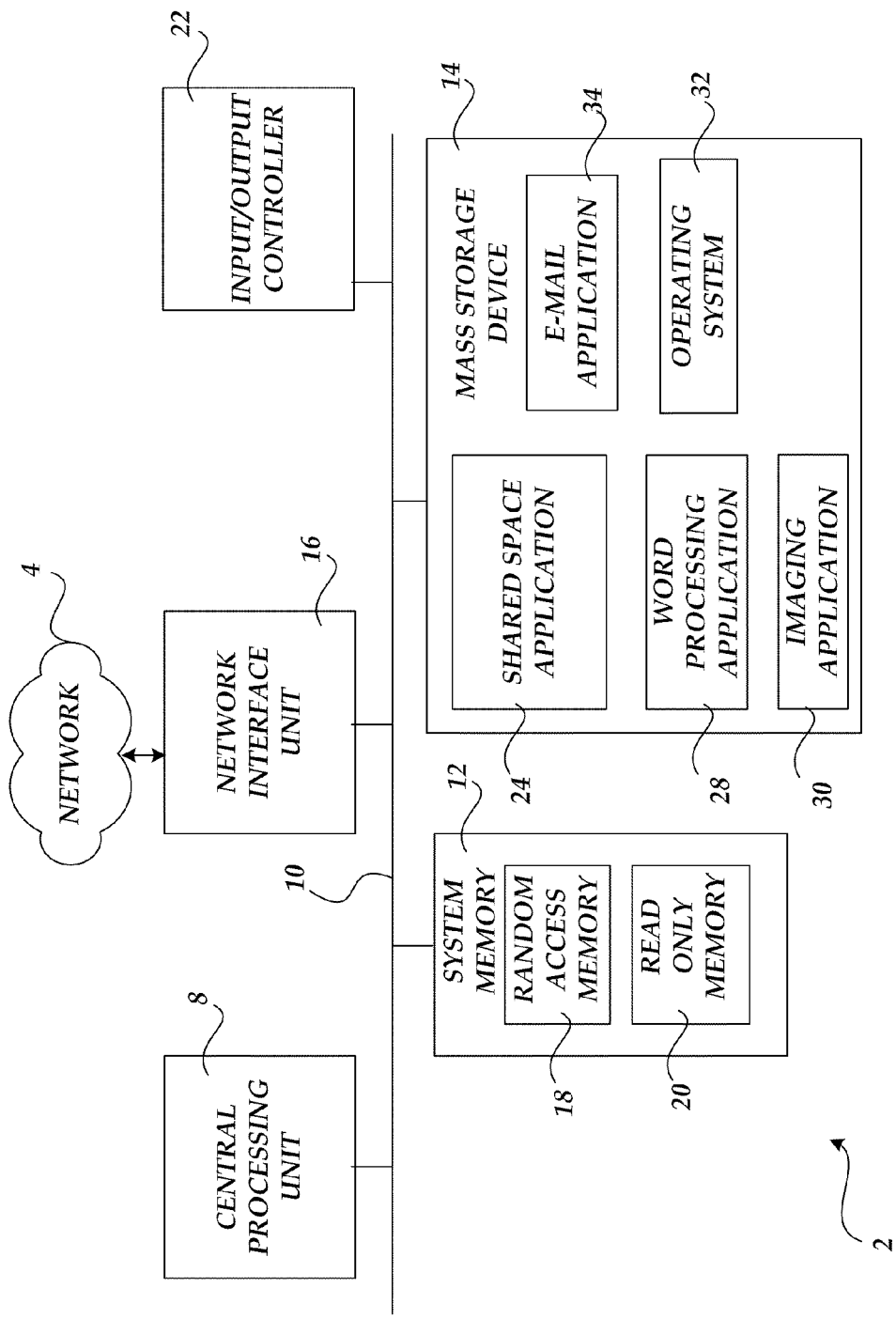
FIG. 6 is a block diagram illustrating a computing environment for implementation of various embodiments described herein.

Referring now to FIG. 6, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 6, an illustrative operating environment for embodiments of the invention will be described. As shown in FIG. 6, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, finger, and/or other means. Similarly, an input/output controller 22 may provide output to a display, a printer, or other type of output device. Additionally, a touch screen can server as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS XP operating system from MICROSOFT CORPORATION of Redmond, Wash. The mass storage device 14 and RAM 18 may also store one or more program modules. In particular, the mass storage device 14 and the RAM 18 may store application programs, such as a word processing application 28, an imaging application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

We claim:

1. A system including at least one processor and memory, the system comprising:
    a space canvas to display expressions having corresponding expression states including normal, focus, and magnify, wherein an expression state controls how a corresponding expression is to be displayed on the space canvas;
    one or more tools to interact with a shared space that is shared by associated users, wherein the one or more tools provide functionality to include an expression including ink, text, and other user expressions on the space canvas, wherein the one or more tools are configured to add and modify expressions within the space canvas in response to offline and online user interactions with the shared space;
    a master copy used in part to update the shared space with participant expressions, wherein the master copy is used to track and maintain changes to the shared space; and,
    an update component to use the master copy to automatically update the space canvas with changes made to the space canvas, the changes including an aggregate of offline changes made by associated users to update the space canvas with the offline changes including previous ink strokes, segments, and any other expressions, the update component to automatically update the space canvas based at least in part on contextual information including time, segment, and ink parameters.

2. The system of claim 1, the update component further to update the space canvas based in part on use of one of the one or more tools to interact with the space canvas using handwritten, video, and audio expressions, wherein a handwritten expression includes digital ink strokes.

3. The system of claim 1, the update component further to expose participant expressions to each communicating participant.

4. The system of claim 3, the update component further to synchronize the participant expressions with shared space data of each online participant.

5. The system of claim 3, wherein the master copy comprises a master file to update the shared space with the participant expressions, wherein the master file is used to track and maintain changes to the shared space.

6. The system of claim 1 including a scrapbook component to store select ones of the participant expressions.

7. The system of claim 1 including a history of the shared space for retrieving previous ink strokes, segments, and other expressions based in part on context information including segment location, segment size, and the ink parameters.

8. The system of claim 1, wherein the one or more tools can be used to create, modify, and save one or more expressions to the space canvas and to retrieve previous inking strokes, segments, and other expressions based in part on associated context information.

9. The system of claim 1, wherein the one or more tools include a toolset tray button, a toolset button, a tool button, and a palette button.

10. The system of claim 1, wherein the space canvas can receive input from one of a stylus, keyboard, and a finger.

11. The system of claim 1 configured to establish a live connection with other participants as part of using the shared space.

12. The system of claim 1, the update component further to expose expressions made by remote participants.

13. The system of claim 1, wherein the one or more tools include magnification and focusing functionality.

14. The system of claim 1, wherein the shared space can be used by various participants to communicate information to one another using the space canvas.

15. A computing device comprising:
    a touchscreen;
    a shared space displayed on the touch screen that includes a canvas to display user expressions including changes made to the canvas based in part on an aggregate of offline changes and a master copy to update the canvas with ink strokes, segments, and other expressions based in part on time, segment, and ink parameters, wherein each user expression includes a number of expression states including normal, focus, and magnify that control how each user expression is to be displayed on the canvas, wherein the master copy is used in part to update the shared space with participant expressions and track and maintain changes to the shared space; and,
    interactive tools displayed on the touchscreen configured to include ink, text, and other user expressions on the canvas as part of offline and online interactions with the shared space.

16. The device of claim 15, wherein the shared space is configured to be updated with participant expressions that include inking, text, and other digital expressions as part of a synchronization.

17. The device of claim 15, further comprising an interactive tool configured to add ink and other digital expressions to the canvas.

18. A method comprising:
providing a shared space that includes a space canvas to display expressions including changes made to the space canvas using an aggregate of changes to update the space canvas including previous ink strokes, segments, and other expressions having corresponding expression states including normal, focus, and magnify, wherein an expression state controls how a corresponding expression is to be displayed on the space canvas;
using a master copy in part to update the shared space with participant expressions, wherein the master copy is used to track and maintain changes to the shared space; and,
updating the shared space based in part on the master copy and operations using interactive tools to include ink, text, and other expressions on the space canvas in response to offline and online interactions with the shared space.

19. The method of claim 18 comprising providing the space canvas as a persistent whiteboard canvas.

20. The method of claim 18 comprising updating the space canvas with remote participant expressions.

* * * * *